United States Patent [19]
Mizukami

[11] Patent Number: 5,423,010
[45] Date of Patent: Jun. 6, 1995

[54] STRUCTURE AND METHOD FOR PACKING AND UNPACKING A STREAM OF N-BIT DATA TO AND FROM A STREAM OF N-BIT DATA WORDS

[75] Inventor: Toshiaki Mizukami, Cupertino, Calif.

[73] Assignee: C-Cube Microsystems, Milpitas, Calif.

[21] Appl. No.: 826,312

[22] Filed: Jan. 24, 1992

[51] Int. Cl.⁶ .............................................. G06F 7/32
[52] U.S. Cl. ............................ 395/375; 364/DIG. 1; 364/DIG. 2; 364/260.7; 364/951.3; 364/947.6; 341/60
[58] Field of Search ................... 364/DIG. 1 MS File, 364/DIG. 2 MS File; 395/250, 375, 400, 550, 600, 775, 800; 341/87, 95, 67, 60

[56] References Cited

U.S. PATENT DOCUMENTS

| | | | |
|---|---|---|---|
| 4,382,286 | 5/1983 | Mitchell et al. | 395/775 |
| 4,491,934 | 1/1984 | Fourcade | 395/550 |
| 4,574,351 | 3/1986 | Dang et al. | 395/250 |
| 4,597,057 | 6/1986 | Snow | 395/375 |
| 4,870,415 | 9/1989 | Van Maren et al. | 341/94 |

*Primary Examiner*—Robert B. Harrell
*Attorney, Agent, or Firm*—Skjerven, Morrill, MacPherson, Franklin & Friel

[57] ABSTRACT

A structure and a method capable of both packing data into and unpacking data from either the little endian or the big endian format are provided. Under the structure and method of the present invention, the packed or unpacked data, as the case may be, is only shifted in one direction. During a packing operation, a stream of n-bit data is packed into a stream of m-bit words. During an unpacking operation, a stream of m-bit packed data is unpacked into a stream of n-bit words. $n \leq m$.

20 Claims, 18 Drawing Sheets

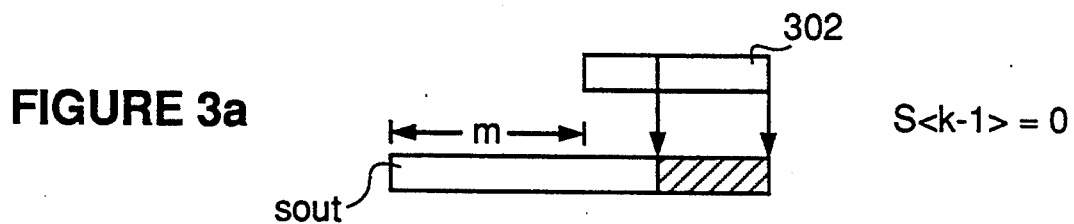
FIGURE 3a   $S<k-1> = 0$
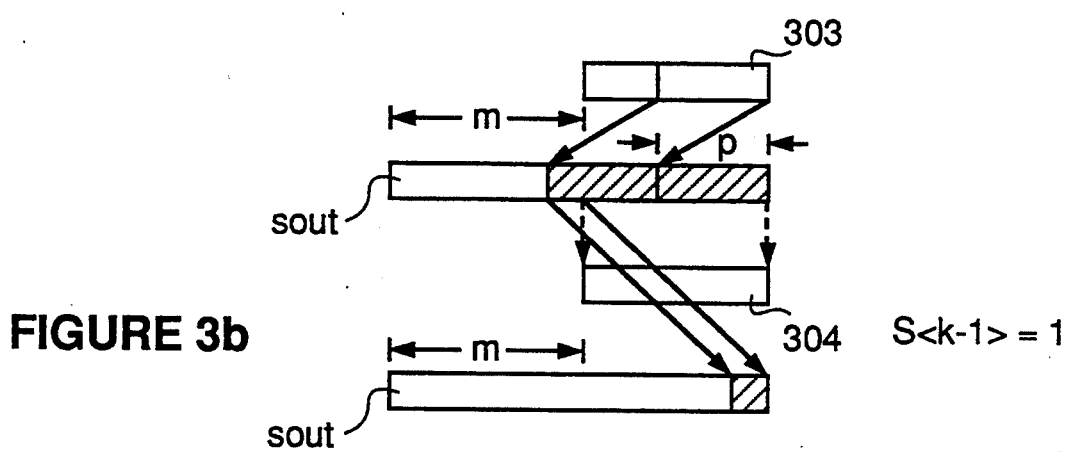
FIGURE 3b   $S<k-1> = 1$
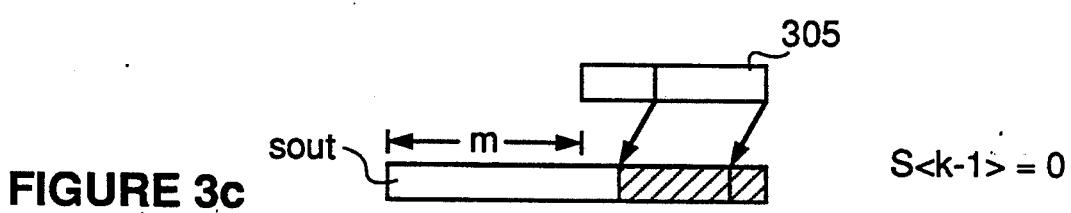
FIGURE 3c   $S<k-1> = 0$
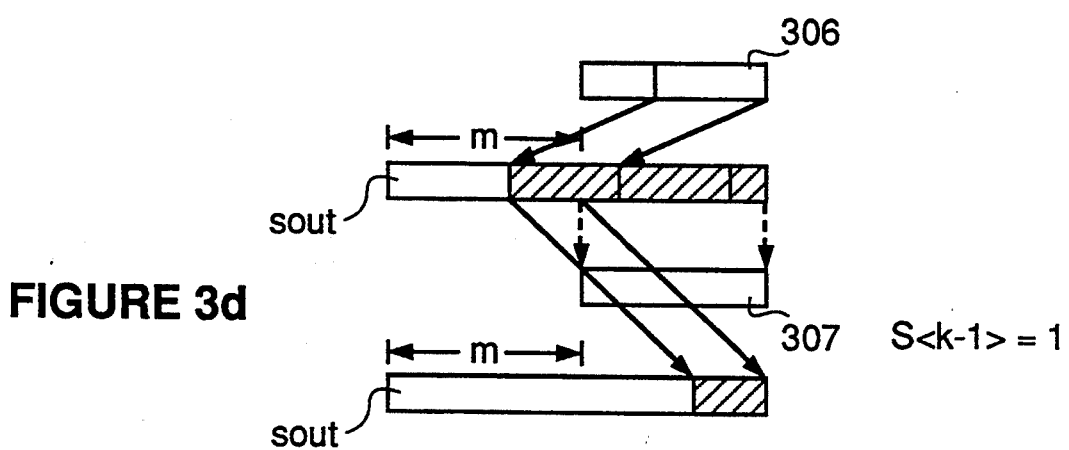
FIGURE 3d   $S<k-1> = 1$ $S<k-1> = 0$ $S<k-1> = 1$ $S<k-1> = 0$ $S<k-1> = 1$

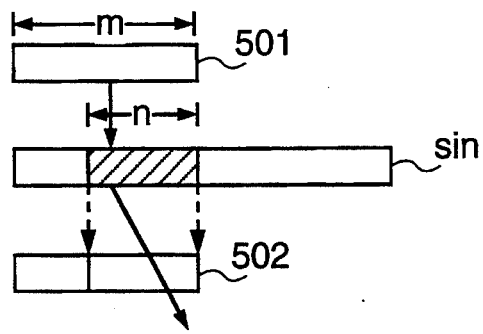
FIGURE 5a  $S<k-1> = 1$
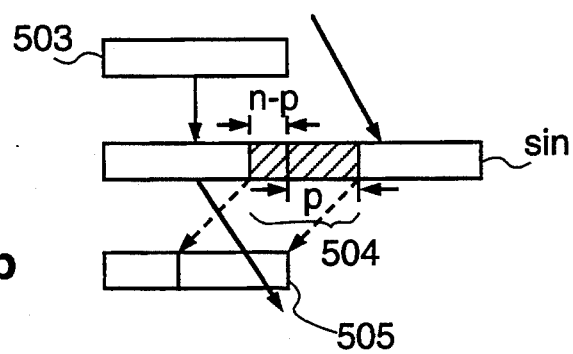
FIGURE 5b  $S<k-1> = 1$
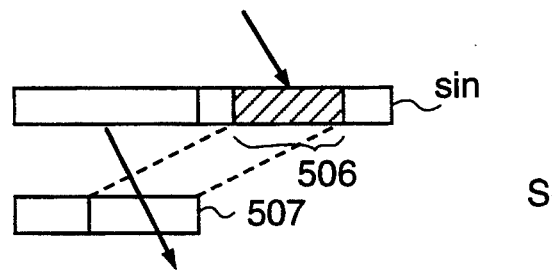
FIGURE 5c  $S<k-1> = 0$
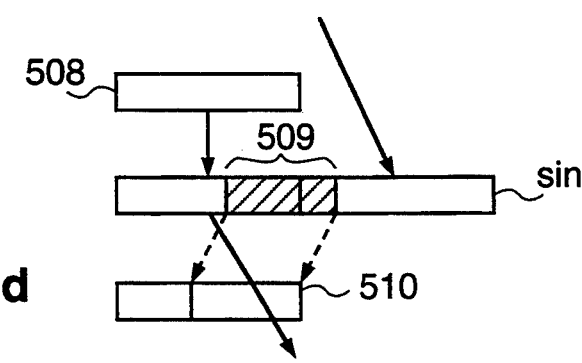
FIGURE 5d  $S<k-1> = 1$
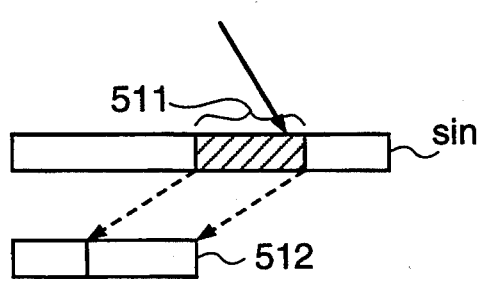
FIGURE 5e  $S<k-1> = 0$

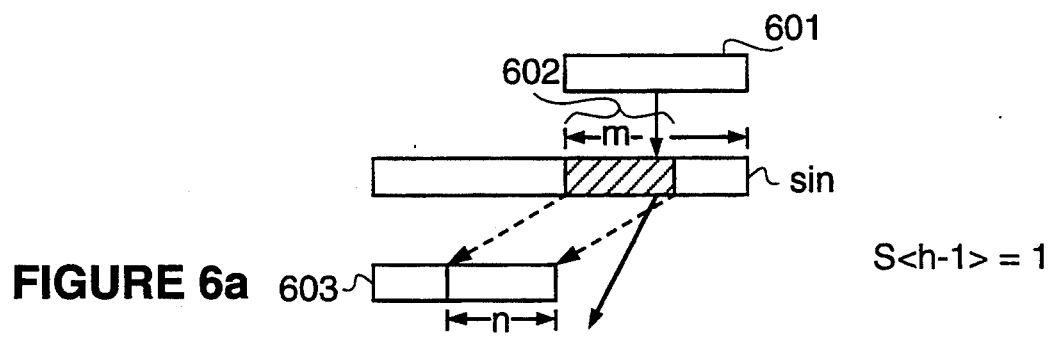
FIGURE 6a  $S<h-1> = 1$
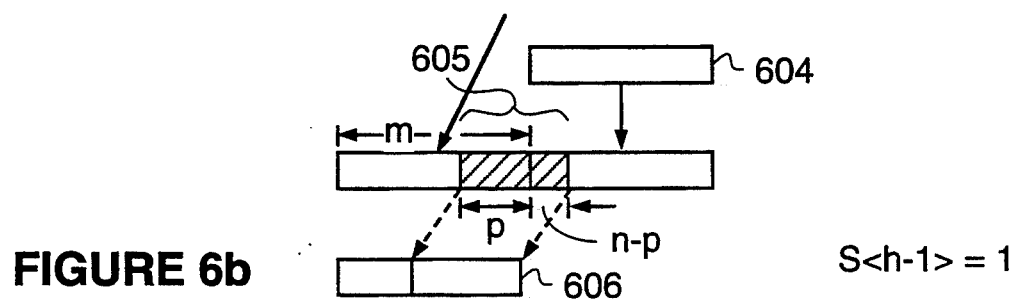
FIGURE 6b  $S<h-1> = 1$
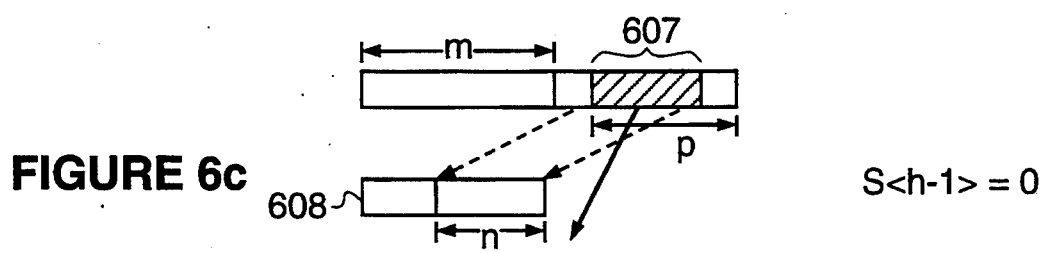
FIGURE 6c  $S<h-1> = 0$
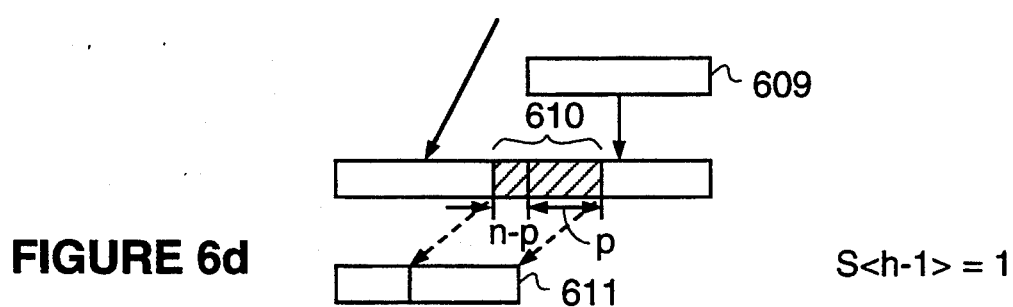
FIGURE 6d  $S<h-1> = 1$
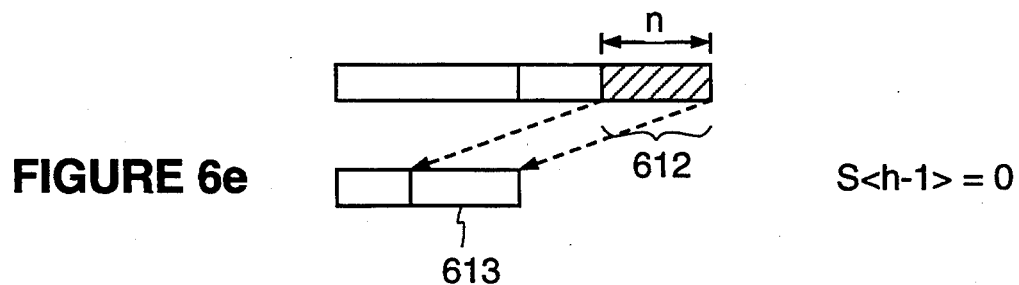
FIGURE 6e  $S<h-1> = 0$

| d | e | P<k-1:0> | S<k-1:0> | Sh<k-1:0> |
|---|---|---|---|---|
| 0 | 0 | P<k-1>=0<br>P<k-2:0> ← S<k-2:0> | S<k-1:0><br>=P<k-2:0>+n | Sh<k-1>=0<br>Sh<k+2:0> = P<k-2:0> |
| 1 | 0 | P<k-1>=0<br>P<k-2:0> ← S<k-2:0> | S<k-1:0><br>=P<k-2:0>-n | Sh<k-1>=0<br>Sh<k+2:0> = P<k-2:0> |
| 0 | 1 | P<k-1>=0<br>P<k-2:0> ← S<k-2:0> | S<k-1:0><br>=P<k-2:0>+n | Sh<k-1:0><br>=-S<k-1:0> |
| 1 | 1 | P<k-1>=0<br>P<k-2:0> ← S<k-2:0> | S<k-1:0><br>=P<k-2:0>-n | Sh<k-2:0> =-S<k-2:0><br>Sh<k - 1>=(~S<k - 2>) • (~S<k - 3>) •••• (~S<0>) |

| Key to FIG. 10 | FIG. 10B |
|---|---|
| FIG. 10A | FIG. 10D |
| FIG. 10C | |

STRUCTURE AND METHOD FOR PACKING AND UNPACKING A STREAM OF N-BIT DATA TO AND FROM A STREAM OF N-BIT DATA WORDS

FIELD OF THE INVENTION

This invention relates to data compression, and in particular relates to apparatus for packing and unpacking data.

DESCRIPTION OF RELATED ART

In a typical computer system, the unit of data transfer into and out of the main storage system (e.g. registers and memory) is called a "word". A word comprises one or more bytes of data; the number of bytes is related to the width of the data path of the computer system. For example, a word in a 32-bit computer is typically four bytes, and a word in a 16-bit computer is typically two bytes. For the purpose of illustration only, the following discussion will assume a word to comprise four bytes. It will be appreciated that the principles discussed herein are applicable to computer systems of any word size.

Many applications, however, require that the bytes of data within a word of memory be individually addressable. Therefore, in a typical computer system, each address corresponds to a byte of data in real or virtue memory. Therefore, in such a system, if a word comprises four bytes, adjacent words are separated by four address units. Within a word, however, the bytes can be ordered in more than one way. The most common ordering schemes are the "big endian" and the "little endian" schemes discussed below.

FIG. 1a shows the big endian scheme, which is used in many computers, such as the Motorola 68000 family of microprocessors, or the IBM 370 family of mainframe computers. Under the big endian scheme, the address of the most significant byte is the address of the word, and the most significant byte has the lowest address of all the bytes in the word. Thus, for the word having address 8 in FIG. 1a, the most significant byte (i.e. the byte including bits 31 to 24) has byte address 8, and the least significant byte (i.e. the byte including bits 7 to 0) has byte address 11.

FIG. 1b shows the little endian scheme, which is also used in many computers, such as the Intel iAPX86 family of microprocessors, or the DEC VAX family of minicomputers. Under the little endian scheme, the address of the least significant byte is the address of the word, and the least significant byte has the lowest address of all the bytes in the word. Thus, for the word having address 8 in FIG. 1b, the most significant byte (i.e. the byte including the bits 31 to 24) has byte address 11, and the least significant byte (i.e. the byte including bits 7 to 0) has byte address 8.

It will be appreciated that compatibility requires that byte reordering be provided when transferring data between computers using different byte ordering schemes. For performance reasons, such mechanism is best provided in hardware.

In many applications, it is desirable to represent information in the least number of bits. Such data representation is efficient for both data storage and data transmission. If the storage is organized in a word length longer than the length of the datum, more than one datum can be packed in a word. This is true even in the case where the word length is not an integral multiple of the length of the datum, if storing a datum across a word boundary is allowed (i.e. part of a datum can be stored in one word, and the rest of the datum is stored in the next word).

As can be readily seen, if data is transmitted between computers using different byte ordering schemes, it is desirable to have a mechanism for packing data into words of the target recipient of the data. It is also desirable to be able to unpack packed data received in words of the transmitting computer system. In the prior art, such system can be achieved by a circuit having a barrel shifter which provides both left and right shift capabilities. However, the circuit size of such a packing and unpacking circuit can be greatly reduced if the desired result is achieved using a unidirectional shifter.

SUMMARY OF THE INVENTION

The present invention provides a method and a structure for packing data in either little or big endian format and for unpacking packed data received in either little endian or big endian format. The method and circuit in accordance with the present invention require only a unidirectional shifter.

Thus, the method and circuit in accordance with the present invention achieve simplicity in implementation and provide compatibility with both big endian and small endian computer systems.

The present invention will be better understood after consideration of the following detailed description and the accompanying drawings.

BRIEF DESCRIPTION OF THE DRAWINGS

FIGS. 3a, 3b, 3c and 3d show fixed-length data being packed into little endian format.

FIGS. 5a, 5b, 5c, 5d and 5e show unpacking packed fixed-length data received in little endian format.

FIGS. 6a, 6b, 6c, 6d and 6e show unpacking packed fixed-length data received in big endian format.

FIG. 7 is a table summarizing the values of the variables p, s and sh under the packing and unpacking processes for each of the little endian and big endian formats.

DETAILED DESCRIPTION

In the embodiments discussed herein, each datum to be packed or unpacked is n bits long and each unit of transfer to and from storage is m bits long, where m is greater or equal to n. Solely for purpose of illustration, the packing and unpacking operation involves only left-shifts in these embodiments. Upon consideration of this detailed description and accompanying drawings, the skilled person will be able to provide, within the scope of the present invention, packing and unpacking operations using only right shifts.

Figure 1A:
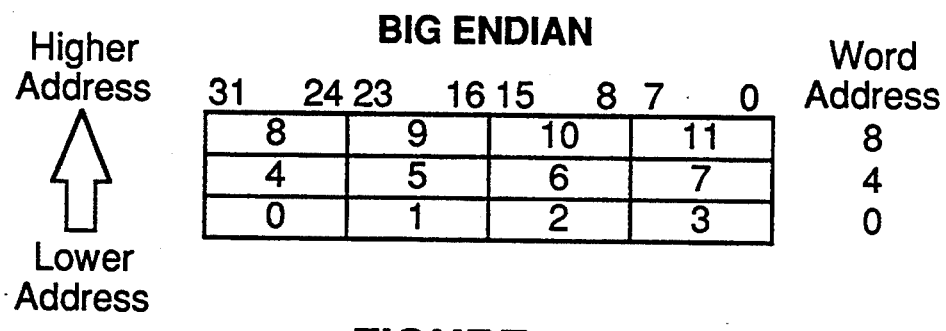
FIG. 1a shows the byte ordering of a word in a computer system using the big endian scheme.
Figure 1B:
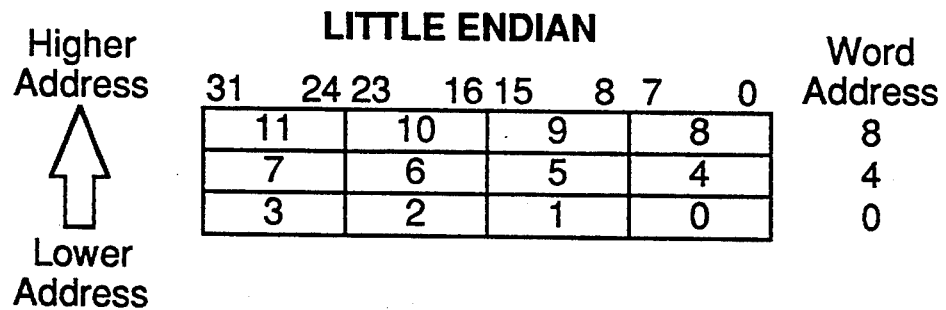
FIG. 1b shows the byte ordering of a word in a computer system using the little endian scheme.
Figure 2A:
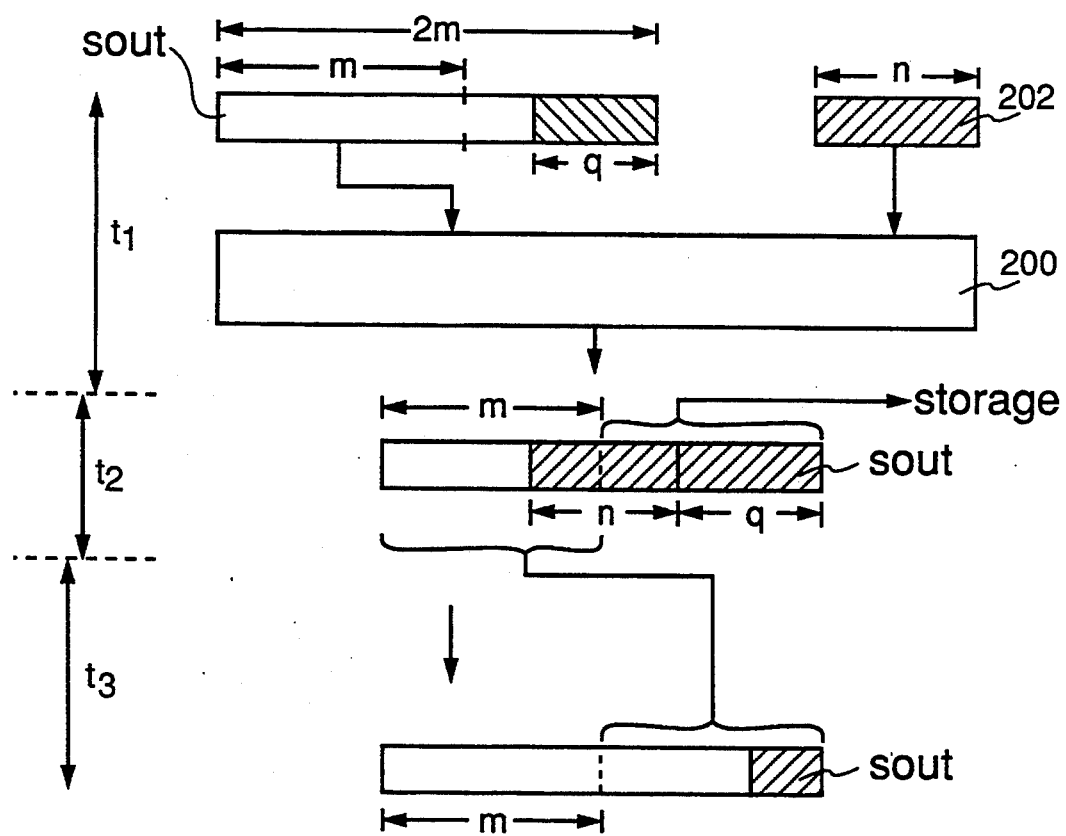
FIG. 2a is a model for the packing operation in accordance with the present invention.

During packing or unpacking operation, in accordance with the present invention, n-bit data are packed into a 2m-bit register sout or unpacked from a 2m-bit register sin. A model for the packing and a model for the unpacking operation in accordance with the present invention are illustrated respectively in FIGS. 2a and 2b. As shown in FIG. 2a, which illustrates the packing operation, an n-bit datum 202 to be packed is received at time $t_1$ when the 2m-bit register sout contains only q bits of packed data. Box 200 represents the circuit which shifts datum 202 to the appropriate bit position and inserts datum 202 into the 2m-register sout as shown at time $t_2$. During packing, whenever the number of bits packed exceeds m, as in the condition of the 2m-bit register sout at time $t_2$, an m-bit datum in one half of the 2m-bit register sout, is output. The other half of the 2m-bit Register sout is zeroed out after being copied (shown in FIG. 2a as the m bits on the right) into the half of 2m-bit register sout previously containing the output datum, so that n+q-m bits of packed data remain in the 2m-bit register sout, as shown in FIG. 2a for time $t_3$. The datum output is stored at the next available location in storage, which is filled in ascending address order.

Figure 2B:
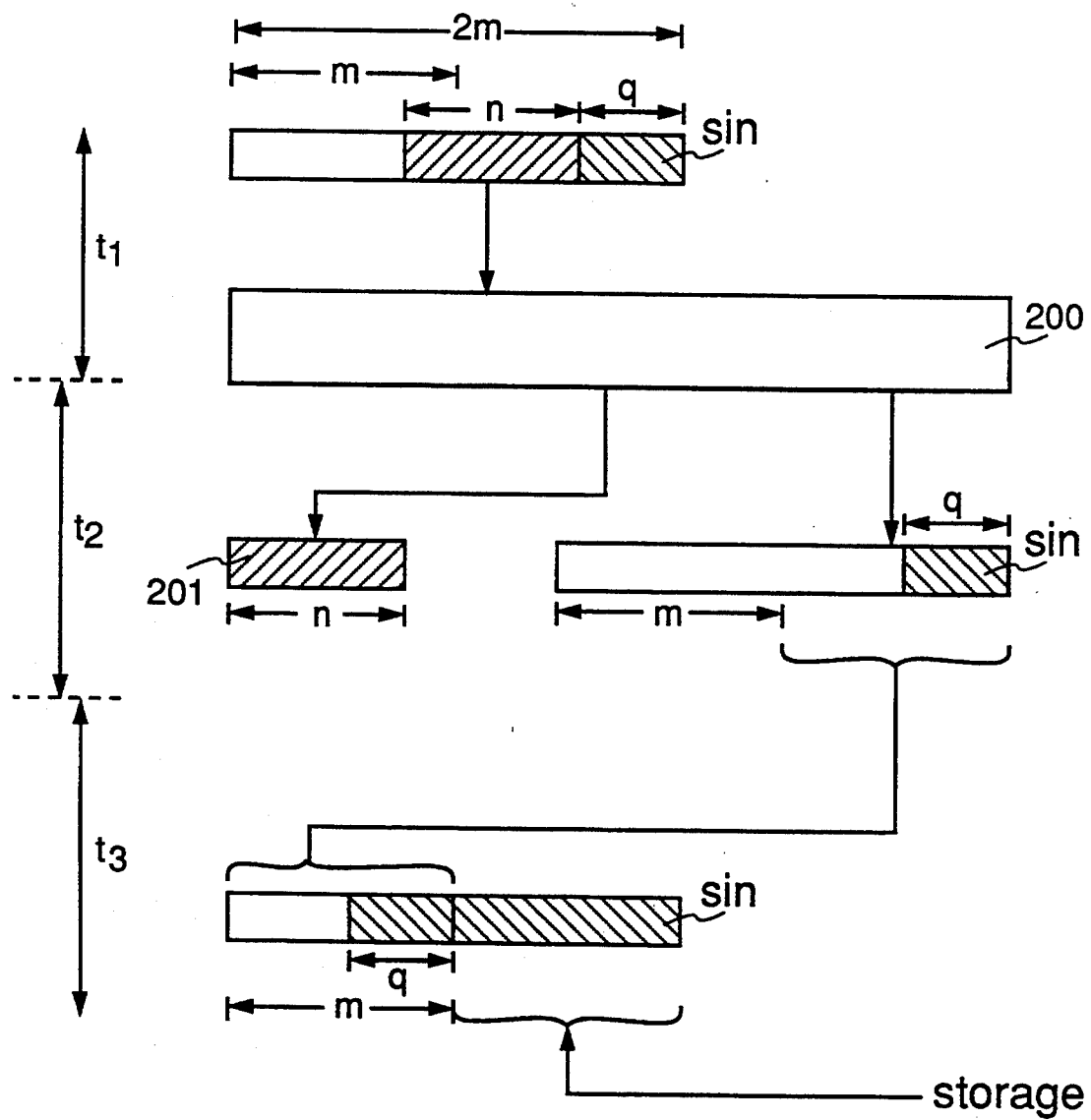
FIG. 2b is a model for the unpacking operation in accordance with the present invention.

FIG. 2b illustrates a model of the unpacking operation in accordance with present invention. As shown in FIG. 2b, 2m-bit register sin contains at least one n-bit packed datum at time $t_1$. Box 200 represents the circuit which extracts at time $t_2$ an n-bit datum 201 from the 2m-bit register sin. During unpacking, whenever the remaining data in the 2m-bit register sin to be unpacked is less than m, such as shown for the 2m-bit register sin at time $t_2$, the half of the 2m-bit register containing packed data in the 2m-register sin is copied into the other half of the 2m-bit register sin, which no longer contains packed data. Thereafter, m bits of packed data are loaded from storage into the 2m-bit register sin, so that m+q bits of data resides in the 2m-bit register sin.

To facilitate the remaining discussion, three variables p, sh and s are defined as follows (k equals to $\log_2 2m$):

- (k−1)-bit variable p which, during packing, represents the current number of bits of data already packed in the 2m-bit register sout and, during unpacking, represents the current number of bits of data remaining to be unpacked from the 2m-bit register sin;
- k-bit variable sh represents the number of bits to left-shift the current datum, in order that the current datum is aligned to be packed or unpacked by a bit-OR operation, with suitable masking, into or from the 2m-bit register sout or sin; and
- k-bit variable s represents the next value of variable p, computed as a k-bit value, i.e. $s<k-1>=0$ and $s<k-2:0>=p<k-2:0>$. Variable s is computed by incrementing or decrementing the value of variable p by n, depending on whether packing or unpacking is performed. Variable s indicates whether a data transfer to or from storage, as explained below, is necessary.

Modulo arithmetic is used for variables p, s, and sh. Hence, the value −p (negative) of (k−1)-bit variable p can be treated as m−p (positive). Likewise, the value −s of k-bit variable s can be treated as 2m−s. In an implementation of the present invention, the variables p, sh, and s can each be represented by the content of a register, a control signal bus or provided implicitly in logic.

Two additional 1-bit variables d and e are defined. Variable d indicates that the current operation is a packing operation when its value is zero, and indicates an unpacking operation otherwise. Variable e indicates that the current operation is a packing or unpacking operation into or from the little endian format when its value is zero, and indicates a packing or unpacking operation into and from the big endian format otherwise.

FIGS. 3a–d show fixed-length data being packed into the little endian format.

FIG. 3a shows that the 2m-bit register sout is clear (i.e. all zero bits), which corresponds to either the initial condition. Initially, the value of variable p and s are respectively zero and n. Because this packing operation outputs data in the little endian format, the least significant byte is the lowest address byte. Hence, the value of variable sh is zero. Since the most significant bit of variable s is 0, no data movement into or out of the 2m-bit register sout (after packing the current n-bit datum 301) is necessary in this instance. After the current n-bit datum 301 is packed, the variable p is updated by copying the lower order k−1 bits of variable s, and then the variables s and sh are correspondingly updated. In this case s is updated to have value 2n, and sh is updated to have value n (see below) The next unpacked datum 302 is fetched.

FIG. 3b shows that, in order to pack the unpacked datum 301 into the 2m-bit register sout already containing p bits of data, a left-shift of p bits is necessary. Hence, for packing under the little endian format, the variable sh takes the value of the variable p. In the packing operation discussed herein for the little endian format, because the number of bits to left-shift is always less than m−1 (the largest value variable p can attain is m−1), the most significant bit of variable sh under packing in the little endian format is always zero.

After packing the current datum 302 into the 2m-bit register sout, the number of bits packed in the 2m-register sout exceeds m. In this situation, the most significant bit of variable s is 1, which indicates that the lower order m bits of the 2m-bit register sout is completely filled by packed data after the current n-bit datum 302 is packed. This condition initiates, following packing of the current n-bit datum 302, a transfer process by which the lower order m bits of the 2m-bit register sout is transferred as packed output datum 304 to be stored at the next available location of packed data storage. In practice, it is not necessary to wait until the m-bit output datum containing the packed data is loaded into the 2m-bit register sout. Instead, as shown in FIG. 3b, the m-bit output datum can be latched from the input leads of the 2m-bit register sout, thereby making the m-bit output datum available for storage without incurring the register delay. After the lower m bits (datum 304) are transferred to storage, the higher order m bits are copied into the lower order m bits of the 2n-bit register sout. The higher order m bits of the 2m-bit register sout are then zeroed. This transfer and copy operation does not involve a right-shift. After the variable p is updated by copying the lower order $k-1$ bits of variable s, and the variables s and sh are updated, the next datum 305 to be packed is fetched and becomes the current datum, as shown in FIG. 3c.

FIG. 3c corresponds to a situation in which the variable s does not exceed the lower order m bits of the 2m-bit register sout after the current datum 305 is packed. At this time, the most significant bit of variable s is 0, so that no data transfer from the 2m-bit register sout to storage is necessary. Upon packing the current datum 305, the variable p is updated by copying the lower $k-1$ bits of variable s, and the variables s and sh are then updated without the transfer and copy operation at the 2m-bit register sout. Thereafter, the next datum to be packed is fetched to become the current datum 306, as illustrated in FIG. 3d.

Figure 11:
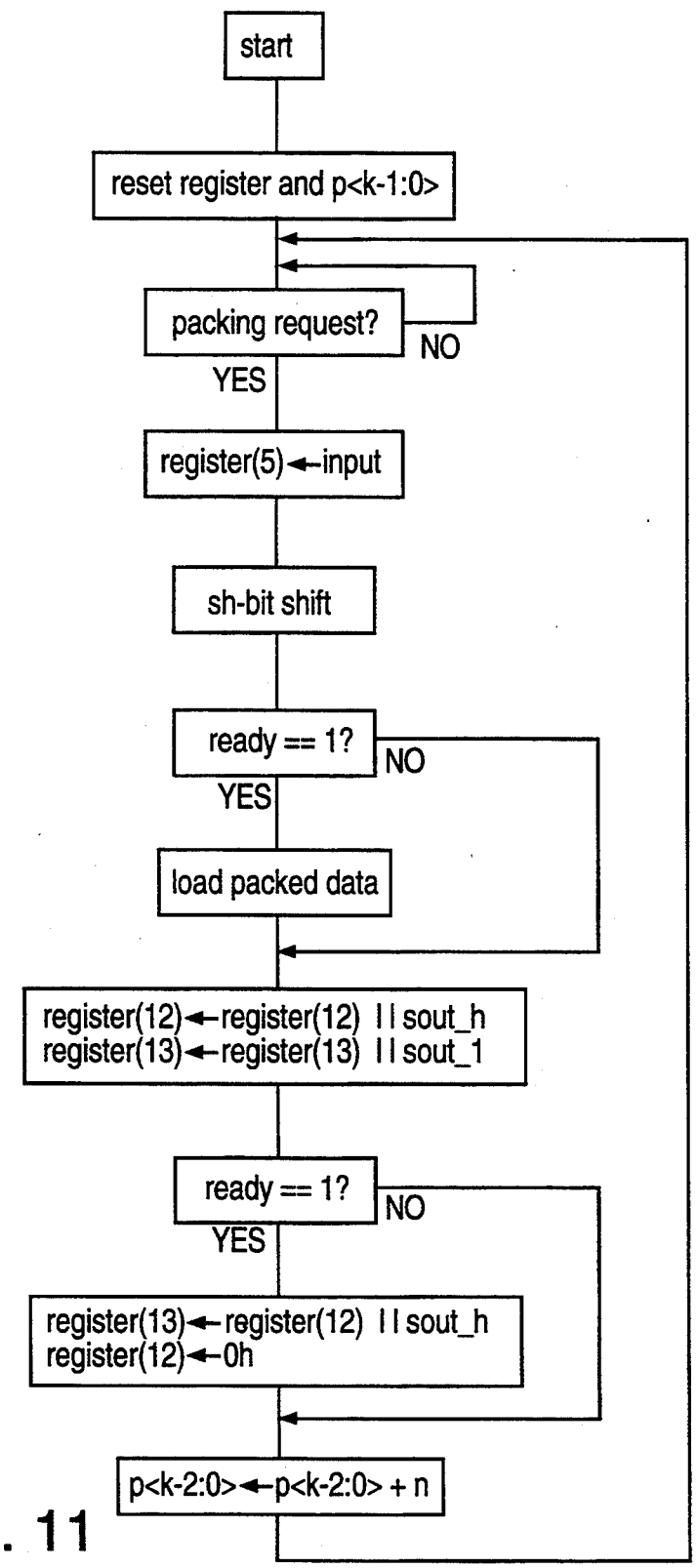
FIG. 11 is a flow chart of the steps by which fixed-length data are packed into little endian format, in accordance with the present invention.

FIG. 3d shows the situation similar to that shown in FIG. 3b, i.e. the number of bits packed in the 2m-bit register sout exceeds m bits after the current datum 306 is packed. (Thus, the most significant bit of variable s is 1). As explained in conjunction with FIG. 3b, a data transfer of the lower order m bits (in this case, output datum 307) of 2m-bit register sout is initiated following packing of the current datum 306. The higher m bits of the 2m-bit register sout are copied into the lower order m bits of the 2m-bit register sout, followed by zeroing of the higher order m bits of the 2m-bit register sout. The algorithm for the packing operation into the little endian format is summarized in the flow chart of FIG. 11.

The entry corresponding to $d=0$ and $e=0$ of FIG. 7 shows analytically the values of the variables p, s and sh under data packing into the little endian format.

FIGS. 4a–d show fixed length data being packed into the big endian format.

Figure 4A:
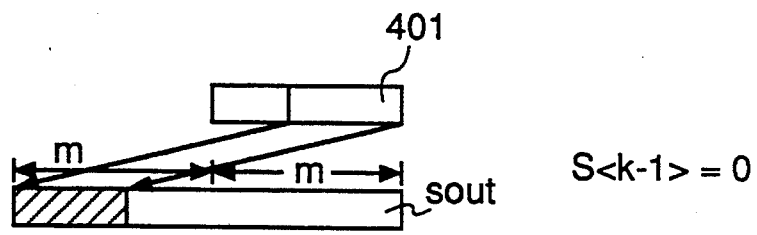
FIGS. 4a, 4b, 4c and 4d show fixed-length data being packed into big endian format.

FIG. 4a shows that the 2m-bit register sout is all clear prior to the packing of the current datum 401. This condition corresponds to either the initial condition, or the condition when the last datum packed exactly fills the higher order m bits of the 2m-bit register sout, such that the resulting data transfer clears the 2m-bit register sout. Initially, the value of variables p and s are respectively zero and n. Because this packing operation outputs data in the big endian format, the most significant byte is the lowest address byte. Hence, the initial value of variable sh is $2m-n$ (i.e. the n-bit datum to be packed must be left-shifted $2m-n$ bits in order to be aligned for packing). Since the most significant bit of the variable s is zero, no data transfer from the 2m-bit register sout to storage is necessary following the packing of the current n-bit datum. Upon packing the current n-bit datum 401, the variable p is updated to the value of lower order $k-1$ bits of variable s, the variables s and sh are then correspondingly updated to arrive at the condition shown in FIG. 4b. At this point, the next datum is fetched and becomes the current datum 402.

Figure 4B:
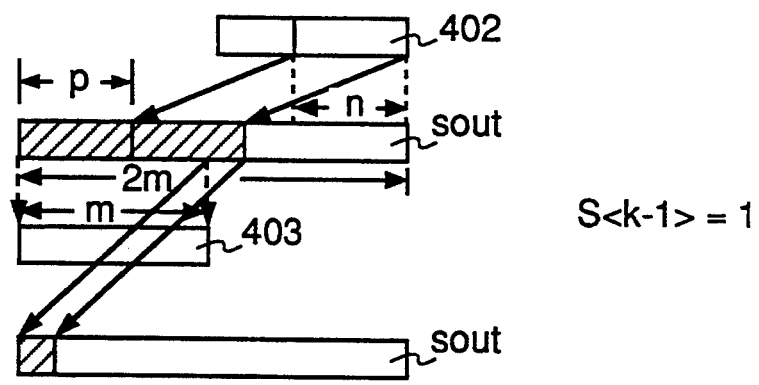
Figure 4C:
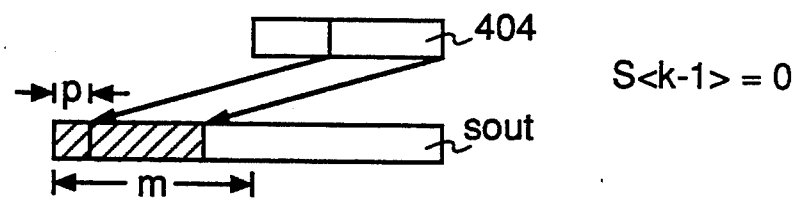

As shown in FIG. 4b, when the current n-bit datum is packed into 2m-bit register sout, the number of bits packed in the 2m-bit register sout exceeds m. (From FIG. 4b, it can be seen that, in order to align an unpacked datum 402 with the 2m-bit register sout containing p bits of packed data, the unpacked datum must be left-shifted by $2m-p-n$ bits, which is also equal to $-s$ bits, if one recalls that $s<k-1:0> = p<k-2:0> + n$ for a packing operation). Because the number of bits of packed data in register sout exceeds m, the most significant bit of variable s is 1, indicating that the higher order m bits of the 2m-bit register sout contains packed data. This condition (i.e. the 2m-bit register sout containing m or more packed bits after packing the current datum) initiates a data transfer operation by which the higher order m bits of the 2m-bit register is transferred as output datum 403 to be stored at the next available location in packed data storage. After the higher order m bits are transferred, the lower order m bits of 2m-bit register sout are copied into the higher m bits of the 2m-register sout. The lower order m bits of the 2m-bit register sout are then zeroed. No right-shift is necessary in this situation also. Thereafter, as shown in FIG. 4c, the variable p is updated by copying the lower $k-1$ bits of the variable s, the variable s and sh are then accordingly updated. The next datum to be packed is fetched and becomes the current datum 404.

FIG. 4c shows the situation in which the variable s does not exceed m, i.e. the number of bits in the 2m-bit register sout does not exceed m even after the current datum is packed, so that the most significant bit of variable s is 0. Therefore, no data transfer or copy operation from the 2m-bit register sout to storage is necessary following the packing operation. Consequently, after the current datum 404 is packed into the 2m-bit register sout, the variables p is updated by copying the lower $k-1$ bits of variable s, and the variables s and sh are accordingly updated. Thereafter, the next datum to be packed is fetched and becomes the current datum 406, as illustrated in FIG. 4d.

Figure 4D:
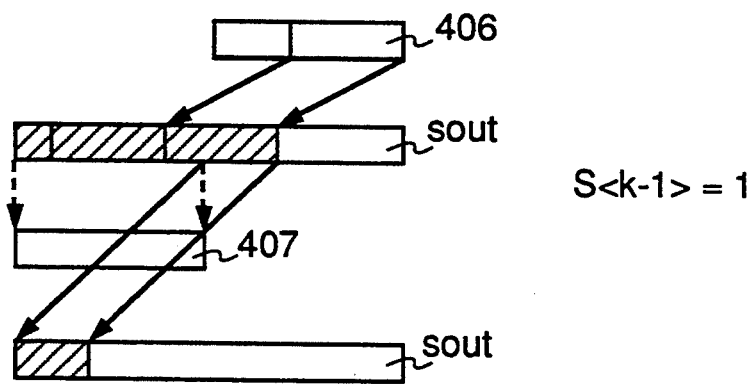
Figure 12:
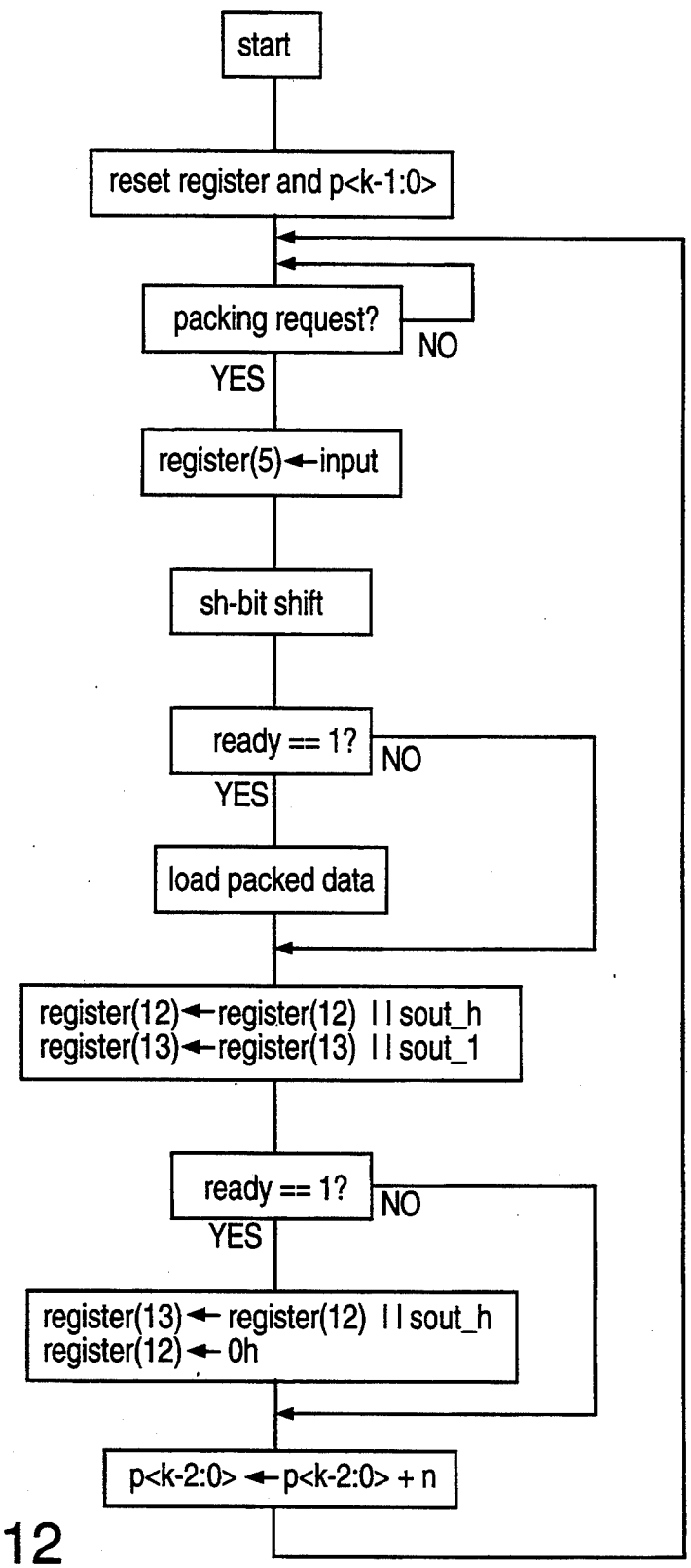
FIG. 12 is a flow chart of the steps by which fixed-length data are packed into big endian format, in accordance with the present invention.

FIG. 4d shows a situation analogous to that shown in FIG. 4b, i.e. the number of packed data bits in the 2m-bit register exceeding m bits after the current datum 406 is packed. As explained in conjunction with FIG. 4b, following the packing of the current datum 406, a data transfer to storage of the higher order m bits in the 2m-bit register sout is initiated. The higher order m bits containing packed data are transferred as output datum 407 to storage, the lower order m bits of the 2m-bit register sout are then copied into the higher order m bits of the 2m bit register sout. The lower order m bits are then zeroed in the 2m-bit register sout. The algorithm for packing operations under the big endian format is summarized in the flow chart of FIG. 12.

The values of variables p, s and sh during packing into the big endian format discussed in FIG. 4a–4d are shown analytically at the entry of the table in FIG. 7 corresponding to $d=0$ and $e=1$.

During unpacking, packed data are loaded into the 2m-bit register sin. Unpacking is accomplished by bit-ORing the contents of the 2m-bit register sin with an m-bit masked word. The most significant $m-n$ bits in the resulting datum are set to zero. FIGS. 5a–e show the unpacking of packed data received in little endian format. As mentioned above, under the little endian format, the least significant byte is the lowest address byte. Hence, unpacking of packed data proceeds from the least significant bits towards the most significant bits.

FIG. 5a shows the input of m bits of packed data (datum 501) into the higher order m bits of the 2m-bit register sin. This condition corresponds either to the initial condition, or the condition in which the most recently unpacked datum occupied bits m−1 through m−n in the 2m-bit register sin (see FIG. 5e below). Initially, the variable p is zero and the variable s equals −n. In this embodiment, the output datum 502 is taken from the higher order m bits of the shifter output. Thus, as shown in FIG. 5a, no left-shift is required to output the first unpacked datum 502 under this initial condition. Hence, the variable sh has an initial value of zero. Unlike the packing operation, where data transfer and copy operations are performed after the current datum is packed and before the variables p, s and sh are updated, under the unpacking operation, data transfer is performed after the variables p, s and sh are updated and before the current datum is unpacked. A copy operation (which copies the higher order m bits of the 2m-bit register sin into its lower order m bits in the little endian format, and from the lower order m bits of the 2m-bit register sin to its higher order m bits in the big endian format) is always performed after each packed datum is unpacked. Hence, in this case after unpacking the first datum 502 and performing the copy operation, p is updated by receiving the lower k−1 bits of variable s. The variables s and sh are updated using the relations s<k−1:0>=p<k−2:0>−n and sh<k−1:0>=-p<k−2:0> (explained below). After the variable s and sh are updated, the next n-bit datum in the 2m-bit register sin becomes the current datum. In this instance, because the current number of data bits in the 2m-bit register sin exceeds m, the most significant bit of the updated variable s is 1.

A data transfer operation is thus initiated before the current datum in the 2m-bit register sin is unpacked. From the next location in storage m bits of packed data (datum 503) are loaded into the higher order m bits of the 2m-bit register sin. The data in the 2m-bit register sin is then left-shifted according to the value of variable sh after the data transfer (if needed) operations. The n-bit datum 504 is extracted from the 2m-bit register sin as unpacked datum 505. From FIG. 5b, it will be appreciated that when unpacking under the little endian format, the data in the 2m-bit register sin (which has m+p=p bits to unpack) is left-shifted p bits to be aligned for output. The variables p, s and sh are then updated. Under unpacking from little endian format, because the value of p is always less than m, the number of bits to shift is therefore also always less than m, so that the most significant bit of variable sh is always zero. After the current datum 505 is unpacked, the variables p, s and sh are updated.

In this instance, since p is greater than n, the most significant bit of the k-bit variable s (which now has value p−n) is 0. Hence, no data transfer operation from storage is initiated. (However, the higher order m bits of the 2m-bit register sin are still copied into its lower order m bits after the most recent unpacking.) The status of the 2m-bit register sin after the copy operation and the variable updates is shown in FIG. 5c. The n-bit datum 506 is then extracted as output datum 507 by left-shifting the 2m-bit register sin by p bits, as shown in FIG. 5c. Thereafter, a copy operation is performed and the variables p, s and sh are updated to result in the situation of FIG. 5d.

In this instance of FIG. 5d, the value of p is less than n, so that the most significant bit of the variable s is 1. Hence, an m-bit input datum 508 is transferred from storage.

Figure 13:
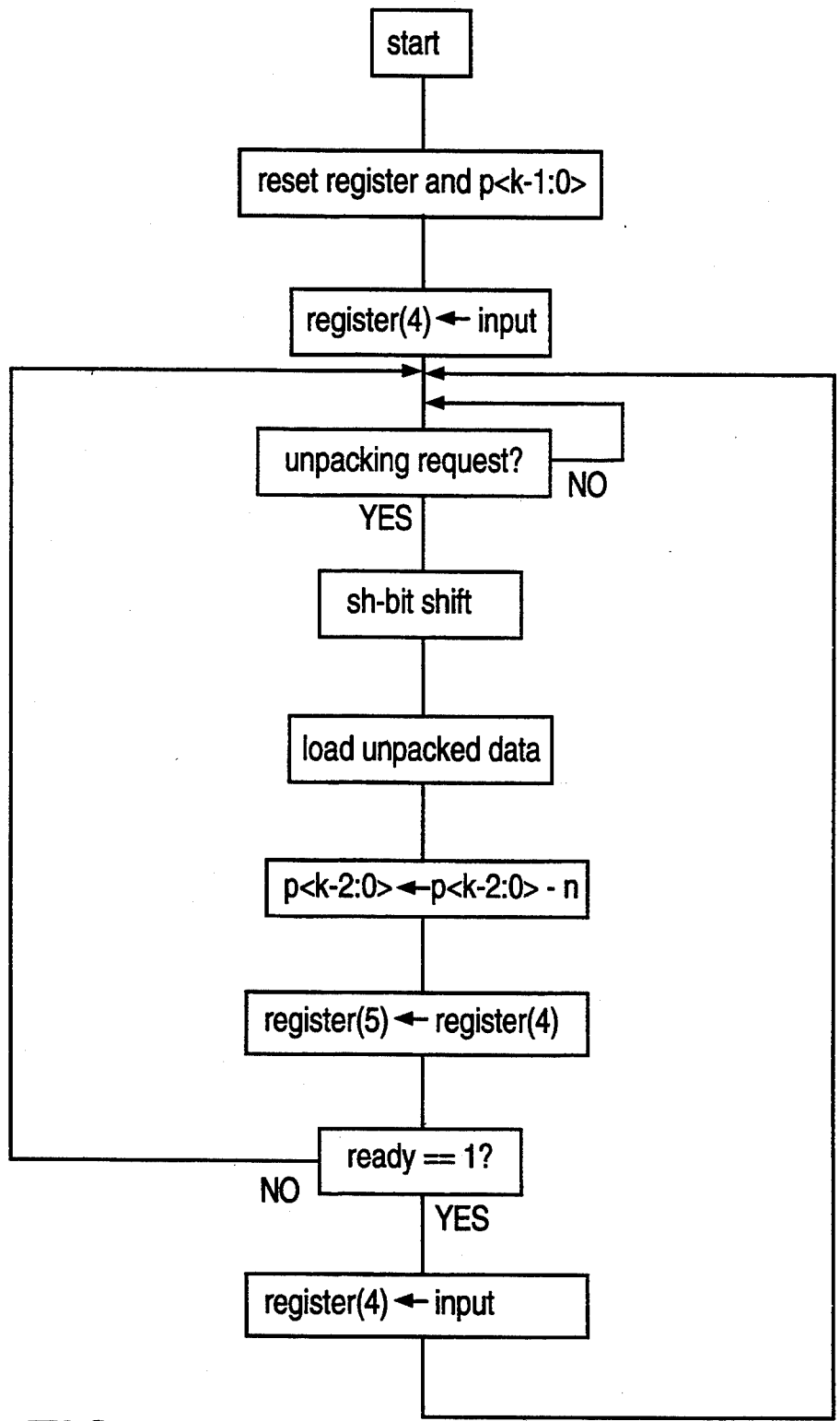
FIG. 13 is a flow chart of the steps by which packed fixed-length data in little endian format are unpacked, in accordance with the present invention.

The next n-bit datum 509 is left-shifted p bits for output as output datum 510. A copy of the higher order m bits of 2m-bit register sin to the lower order m bits is performed to result in the condition shown in FIG. 5e, after the variables p, s and sh are updated. FIG. 5e shows the situation in which the value of p equals n, so that the most significant bit of the variable s is 0. Hence, no packed data is transferred from storage. After the n-bit datum 511 of FIG. 5e is unpacked as output datum 512, the condition of FIG. 5a is once again reached. The rest of the unpacking process will therefore be appreciated to proceed in the manner described in FIGS. 5a–e. The unpacking operation from the little endian format is summarized in the flow chart of FIG. 13.

The values of p, s and sh during unpacking from the little endian format discussed in FIG. 5a–e are analytically shown in the table of FIG. 7, at the entry corresponding to d=1 and e=0.

FIGS. 6a–e show the unpacking of packed data received in the big endian format. Like unpacking in the little endian format, under the big endian format, packed data are loaded into the 2m-bit register sin, and n-bit data are extracted therefrom by bit-ORing the contents of 2m-bit register sin with an m-bit word. The higher order m−n bits of the bit-OR result is then zeroed. As mentioned above, under the big endian format, the most significant byte is the lowest address byte. Hence, unpacking of packed data proceeds from the most significant bit towards the least significant bit.

FIG. 6a shows the input of m bits of packed data (as input datum 601) into the lower order m bits of 2m-bit register sin. FIG. 6a corresponds to either the initial condition, or the condition in which the most recently unpacked datum resided at the least significant n bits of the 2m-bit register sin. Initially, the variable p is zero. The variable s equals −n, so that the most significant bit of variable s is 1. As can be seen from FIG. 6a, because the output datum in this instance is taken from the most significant m bits of the shifter output datum, a left-shift of n bits is required (e.g. to output n-bit datum 602 as output datum 603) under this initial condition. Hence, the variable sh has initial value of n.

Since the most significant bit of variable s is 1, a data transfer is initiated in which m bits of packed data (i.e. m-bit datum 604) from the next location in storage are loaded into the lower order m bits of the 2m-bit register sin. Bits m−1 through m−n of the 2m-bit register sin is then left-shifted n bits to be aligned for the unpacking operation. Like unpacking in the little endian format, a copy operation, in this case from the lower order m bits of 2m-bit register sin to its higher order m bits, is performed after n-bit datum is extracted and output as output datum 603. Although not necessary in some cases, this copy operation is always performed after each datum unpacked. Performing the copy operation regardless of whether it is needed simplifies control.

The variable p is then decremented by n, the variables s and sh are accordingly updated and the next datum 605 to unpack becomes the current datum, as shown in FIG. 6b. Since the value of the variable p is less than n at this instance, the most significant bit of variable s is 1, so that m bits of packed data are input as input datum 604 from storage. From FIG. 6b, it can be seen that, in order to align the packed n-bit datum 605 for output, the 2m-bit register sin having m+p bits of data to unpack must be left-shifted by n−p bits, which is equal to −s bits (recalling that s<k−1:0>=p<k−1:0>−n, where p<k−1>=0).

The content of the 2m-bit register sin is shifted n−p bits for unpacking and output as output datum 606. After the copy operation, the variables p, s and sh are updated to result in the situation shown in FIG. 6c. As shown in FIG. 6c, variable p is greater than n, so that the most significant bit of variable s is 0. Consequently, no data transfer from storage is necessary. Note that after the last datum 605 (the current datum of FIG. 6b) is unpacked, the copy operation renders both halves of the 2m-bit register sin identical. (This is one situation in which a copy operation could have been omitted). However, since no input from storage is required in the situation of FIG. 6c, the current datum 607 is left-shifted from the lower order m bits of the 2m-bit register sin. After the current datum is output as output datum 608, the lower order half of the 2m-bit register sin is again copied into the higher order half of the 2m-bit register sin. Thereafter, the variables p, s and sh are updated, as shown in FIG. 6d.

Since p is less than n in the situation shown in FIG. 6d, the most significant bit of variable s is 1. This condition is similar to that shown in FIG. 6b. Hence, m bits of packed data are input as input datum 609 from storage and the next datum 610 is unpacked as output datum 611 after being left-shifted n−p bits. The lower order m bits of the 2m-bit register sin are again copied into the higher order m bits of the 2m-bit register sin. The variables p, s and sh are then updated to result in the condition shown in FIG. 6e. In FIG. 6e, exactly n bits of packed data remain in the 2m-bit register sin. In this instance, the variable s is 0. Hence, no input of packed data from storage is necessary. In this instance, there is a choice between not shifting the content of the 2m-bit register sin (since the higher order m bits and the lower order m bits are identical due to the copy operation) or left-shifting the contents of 2m-bit register sin by m bits. In this embodiment, left-shifting by m bits the content of 2m-bit register sin is chosen. The other choice, however, is equally valid. After unpacking the current datum 612 as output datum 613, a copy of the lower order m bits of the 2m-bit register sin to the register's higher order m bits is performed. The variable p, s and sh are then updated to result in the situation similar to that already shown in FIG. 6a. Hence, it will be appreciated that the unpacking operation from the big endian format can be inferred from the FIGS. 6a–e.

Figure 14:
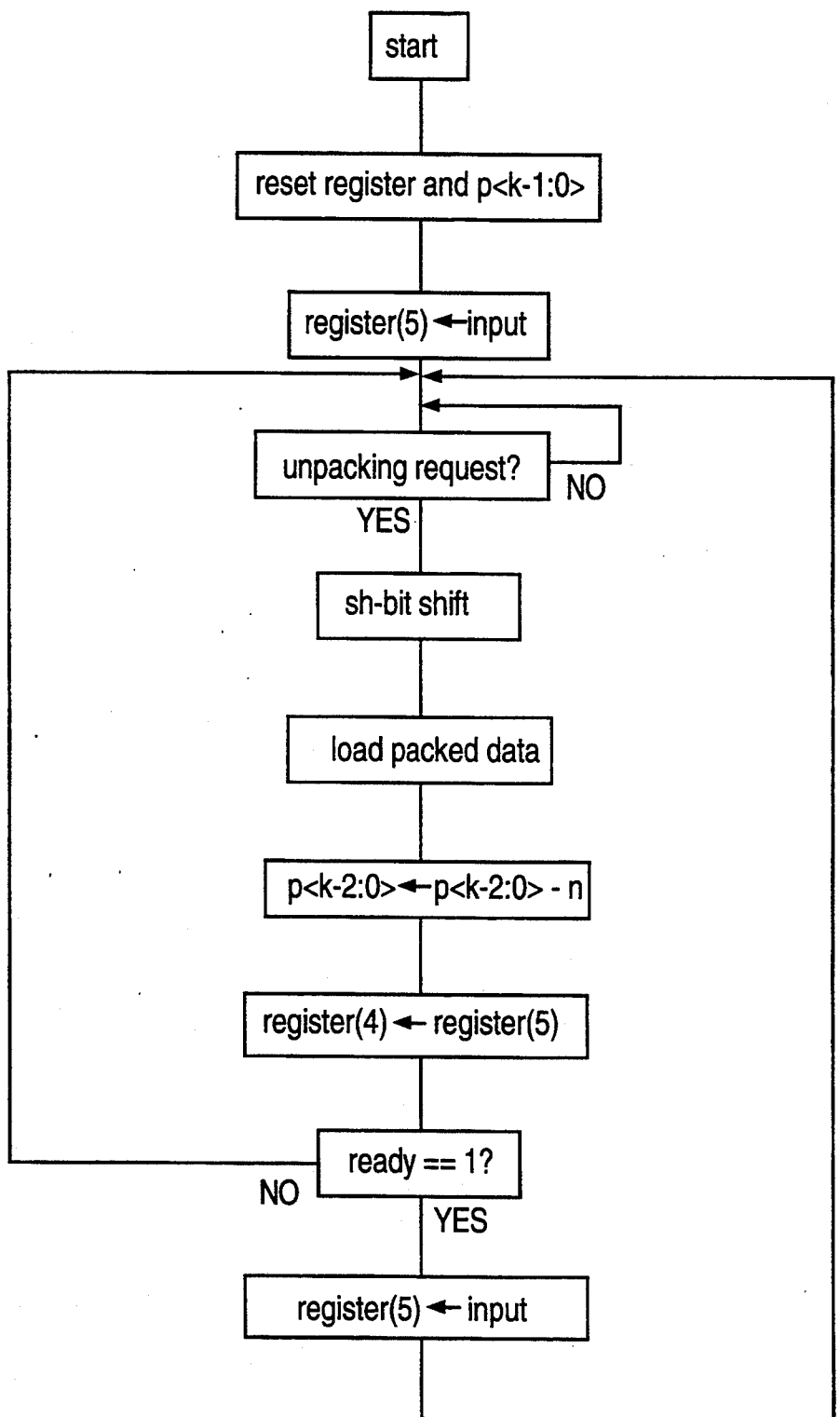
FIG. 14 is a flow chart of the steps by which big endian format packed fixed-length data are unpacked, in accordance with the present invention.

The unpacking operation from the big endian format is summarized in the flow chart of FIG. 14.

The values of variable p, s and sh under unpacking from the big endian format discussed in FIG. 6a–c are analytically shown in FIG. 7, at the entry corresponding to d=1 and e=1.

The following logic equations summarizes the values of variable p, s and sh under the various packing and unpacking processes discussed above:

$$p<k-1> = 0$$

$$p<k-2:0> <-s<k-2:0>$$

$$s<k-1:0> = p<k-1:0> + (\sim d)^*n + d^*n$$

$$sh<k-1> =$$

$$e^*((\sim s<k-1>)(+)((\sim s<k-2>)^*(\sim s<k-3>)^* \ldots$$

$$(\sim s<0>))(+)(d^*(\sim s<k-1>)));$$

$$sh<i> = e^*((\sim s<i>)(+)((\sim s<i-1>)^*(\sim s<i-2>)^* \ldots$$

$$(\sim s<0>))) + \sim e^*p<i>,$$

for $i = k-2, k-3, \ldots 2, 1$;

Note:
1. $\sim$ is the bit-invert operator (i.e. $\sim 1 = 0$ and $\sim 0 = 1$), + is the OR operator, and * is the AND operator.
2. $p<k-1:0>$ is all zeros initially.

Figure 8:
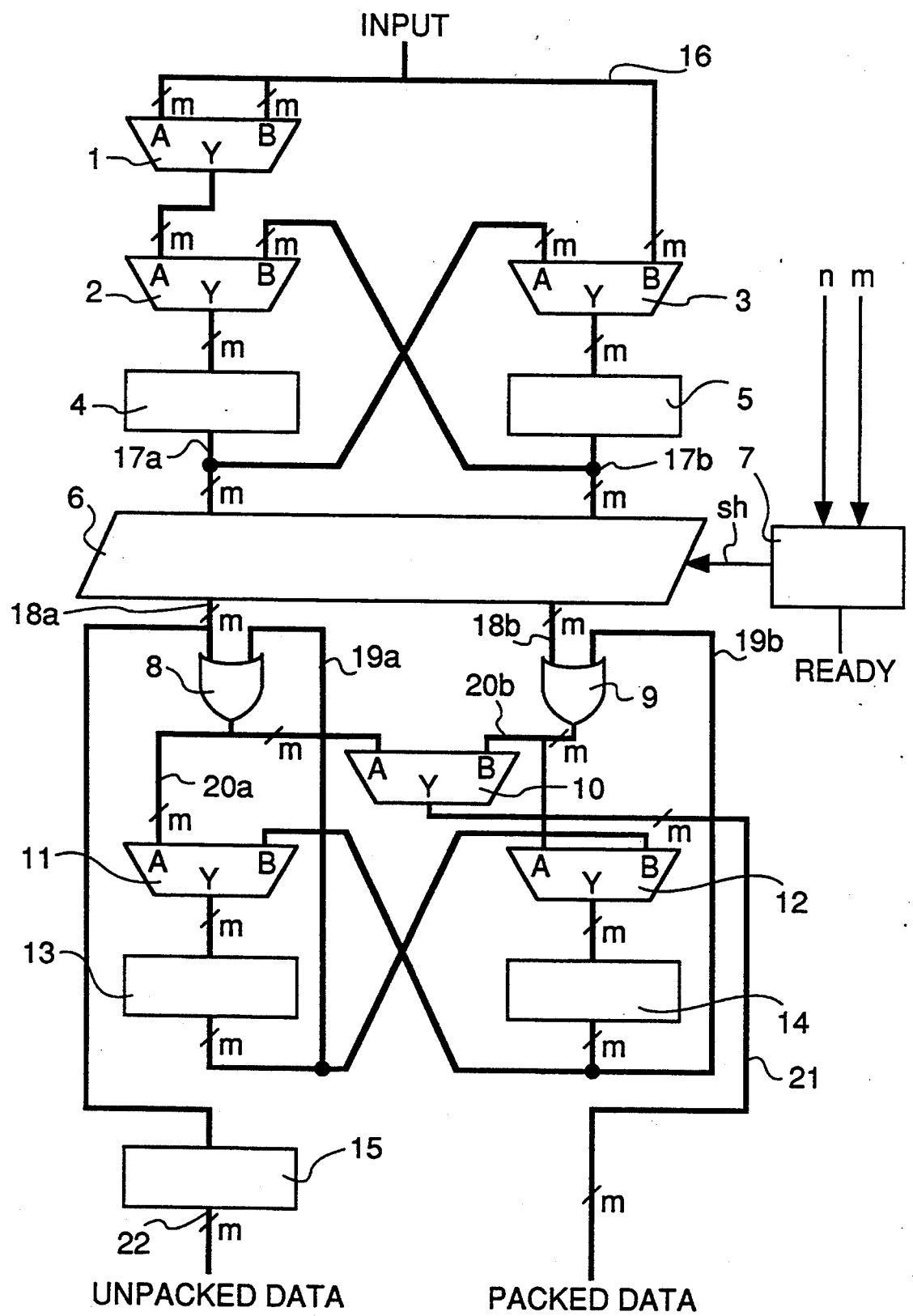
FIG. 8 shows an embodiment of the present invention providing both the packing of fixed-length data into either little endian or big endian format and the unpacking of fixed-length data received in little endian or big endian format.

FIG. 8 shows an embodiment of the present invention which provides both packing and unpacking operations in the manner described above in conjunction with FIGS. 3a–d, 4a–d, 5a–e, and 6a–e.

As shown in FIG. 8, during the packing operation, n-bit input data arrive one datum at a time on m-bit wide bus 16, and are loaded in order into register 5 via multiplexor 3. Each input datum is presented on bus 17b as input to the unidirectional shifter 6 to be left-shifted the number of bits specified by k-bit control bus sh. Control bus sh (representing the variable sh discussed above) is provided by shift control logic 7, which is discussed in detail in the next section. The shifted datum is provided as output datum of the unidirectional shifter 6 on the 2m-bit bus 18, which is formed by the two m-bit buses 18a and 18b. The 2m-bit bus is bit-ORed at the OR gates 8 and 9 with the 2m-bit bus 19, which is formed by the two m-bit buses 19a and 19b. Buses 19a and 19b are respectively the higher m-bit and lower m-bit output buses of the 2m-bit register sout, which is formed by the registers 13 and 14. The bit-ORed operation performed at OR gates 8 and 9 packs the aligned input n-bit datum on bus 19 into the content of the 2m-bit register sout. The resulting 2m-bit datum on bus 20 is loaded back into the 2m-bit register sout (i.e. registers 13 and 14) via multiplexers 11 and 12. Bus 20 is formed by the buses 20a and 20b. When m or more bits of packed data are available in the register sout (i.e. the combination of registers 13 and 14), an m-bit packed datum is forwarded to storage over m-bit bus 21. Copying of the lower m bits to the higher m bits of the 2m-bit register sout and vice versa are effectuated by selecting the respective B-input of buses 19b and 19a of the multiplexers 11 and 12.

During the unpacking operation, m-bit input packed data are received from storage over input bus 16 into one of the two registers 4 or 5, depending upon whether the packed data are stored in the little endian or the big endian format. The registers 4 and 5 together form the 2m-bit register sin. Little endian format data are received on bus 16 from storage and are transferred via multiplexer 2 into register 4, which contains the higher m bits of the 2m-bit register sin. Multiplexer 1 provides a mechanism for a byte-swapping operation when the packed data are received from a big endian machine but packed in little endian format. Likewise, Big endian packed data are received from storage on bus 16 and are transferred via multiplexer 3 into register 5, which contains the lower m bits of the 2m-bit register sin. Copying the higher m bits into the lower m bits of 2m-bit register sin and vice versa are effectuated by selected the respective B-input buses 17b and 17a of the multiplexers 2 and 3. (Buses 17b and 17a are the higher m-bit and lower m-bit output buses of the 2m-bit register sin). The output bus 17, formed by buses 17a and 17b, are provided as input to the unidirectional shifter 6 to be shifted the number of bits specified by the control bus sh. Control bus sh, representing the variable sh discussed above, is provided by the shifter control logic 7 (discussed in detail in the next section). The shifted 2m-bit datum is provided as output datum of the unidirectional shifter 6 on bus 18, which is formed by the two m-bit buses 18a and 18b. The output unpacked datum is contained in the lower n bits of the m-bit bus 18a. Mask unit 15 zeroes the higher order m−n bits of 18a to provide the unpacked datum on m-bit bus 22.

Figure 9:
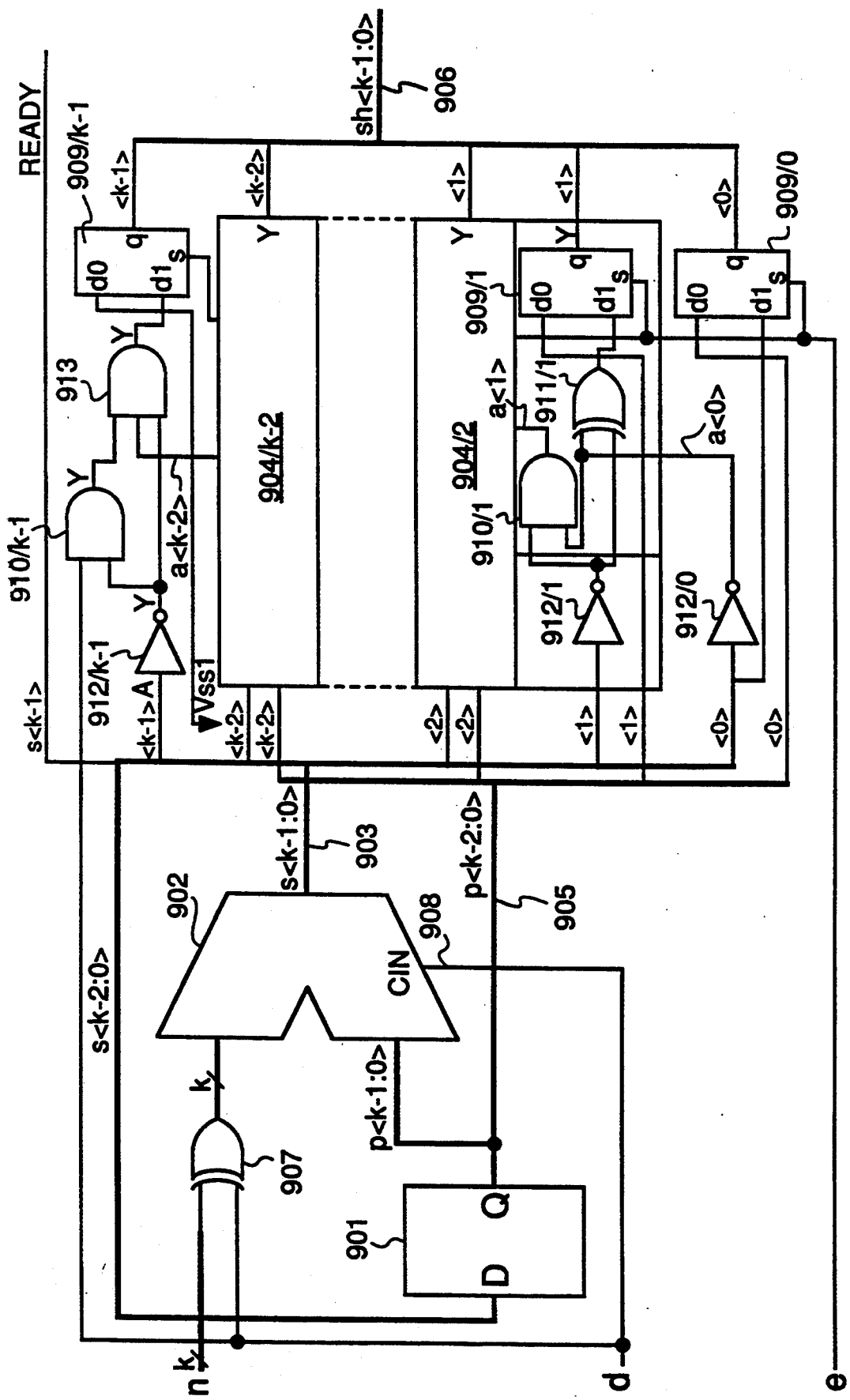
FIG. 9 shows the shifter control logic 7 for providing the signals on control bus sh to the unidirectional shifter 6 of FIG. 11.

FIG. 9 shows in detail the shifter control unit 7, which provides the k-bit control bus sh to the unidirectional shifter 6 of FIG. 8. As shown in FIG. 9, signal d selects whether packing or unpacking operation is performed. During packing, the k-bit full adder 902 adds n to the value on k-bit bus 905, which represents the variable p, and provides the k-bit result of the addition as an output datum on bus 903. The output datum on bus 903 represents the variable s. The most significant bit of k-bit bus 905 is always 0 (recall that variable p is defined as a (k−1)-bit quantity in the above). During unpacking, the k-bit full adder 902 subtracts the value n from the value on k-bit bus 905 and provides the result of the subtraction (also as a k-bit value) as an output datum on bus 903. In this embodiment, subtraction is achieved by adding the value of variable p to the value −n, which is achieved by inverting the input value n using exclusive-OR gate 907 and adding a 1 to the result via the carry-in input lead 908 of the full adder 902. The value on bus 903, when latched by k-bit register 901, becomes the next value of the variable p.

The signals on control bus 906 (sh) are derived in accordance with the equation for the variable sh described above, i.e.

$$sh<k-1> = e*((\sim s<k-1>) \, (+) \, ((\sim s<k-2>)*(\sim s<k-3>)* \ldots (\sim s<0>)) \, (+) \, (d*(\sim s<k-1>)));$$

$$sh<i> = e*((\sim s<i>) \, (+) \, ((\sim s<i-1>)*(\sim s<i-2>)* \ldots (\sim s<0>))) + \sim e*p<i>,$$

for i=k−2, k−3, ... 2, 1

From this equation, it will be appreciated that, when packing into or unpacking from the little endian format, the bits of bus 903 has the value of the variable p. This is accomplished by the 1-bit variable e which selects the bit of bus 905 (representing variable p) at the d0 input of each of the multiplexers 909/0 to 909/k−1. Multiplexers 909/1 through 909/k−2 each correspondingly belong to one of the identical circuits 904/1 to 904/k−2.

Alternatively, when the packing or unpacking is to or from the big endian format, in addition to circuits 904/1 through 904/k−1, inverters 912/0 and 912/k−1, AND gate 910/k−1, and 3-input exclusive-OR gate 913 implement the shift value for packing and unpacking under the big endian format (i.e. when the value of the variable sh is −s). Using the relation −s=~s+1, in this embodiment, the variable sh under the big endian format is implemented by a generally known full-adder circuit, having logic equations:

$$sh<k-1> = (\sim s<k-1>* \sim s<k-2>* \ldots * \sim s<2>* \sim s<1>* \sim s<0>) (+) d* \sim s<k-1> \quad \text{sh.1}$$

$$sh<i> = \sim s<i> (+) (\sim s<i-1>* \sim s<i-2>* \ldots * \sim s<1>* \sim s<0>) \text{ for } i=1, 2, 3, \ldots, k-2 \quad \text{sh.2}$$

$$sh<0> = s<0>$$

Note: (+) is the exclusive-OR operator, ~ is the bit-invert operator and * is the AND operator.

Note that the final term in sh<k−1> (equation sh.1) involving the variable d is necessary because, in this embodiment, the option of shifting m bits is chosen over the option of not shifting for the situation illustrated in FIG. 6c under unpacking from the big endian format.

Each of the circuits 904/1 through 904/k−2 are identical, and receives as input datum one bit each of the input buses 903 and 905. Each bit of buses 903 and 905 respectively corresponds to the bits s<i> and p<i> of variables s and p (where i ranges between 1 and k−2). Each circuit provides as output on bus 906 one bit of the variable sh. In addition, each circuit also receives a bit a<i−1> of a variable a, and provides as output another bit a<i> of variable a, where a<i> is the AND product of ~s<i> with a<i−1> (note: a<0>=~s<0>).

Each of circuits 904/1 through 904/k−2 comprises: a) an exclusive-OR gate, such as exclusive-OR gate 911/1, for providing the bit value of the sh variable under the big endian format; b) an inverter, such as inverter 912/1, for inverting the input bit representing s<i>; c) an AND gate, such as AND gate 910/1, for providing the output bit a<i> from input bits representing a<i−1> and s<i>; and a multiplexer, such as multiplexer 909/1, which selects between the p<i> and the corresponding bit of −s, depending respectively on whether the little endian format or the big endian format is chosen.

Inverter 912/0 and 909/0 provides the bit which represents sh<0> in bus 906. Inverter 912/k−1, AND gate 912/k−1, exclusive-OR gate 913, and multiplexer 909/k−1 provides the bit of bus 906 representing sh<k−1>. The logic equation for sh<k−1> provides for the case involving the variable d discussed in conjunction with equation sh.1 above. The bit of bus 903 representing s<k−1> (most significant bit of variable s) is used as a "ready" signal to indicate whether a data transfer to or from storage, as discussed above in conjunction with FIGS. 3a-d, 4a-d, 5a-e, and 6a-e, is necessary.

Figure 10A:
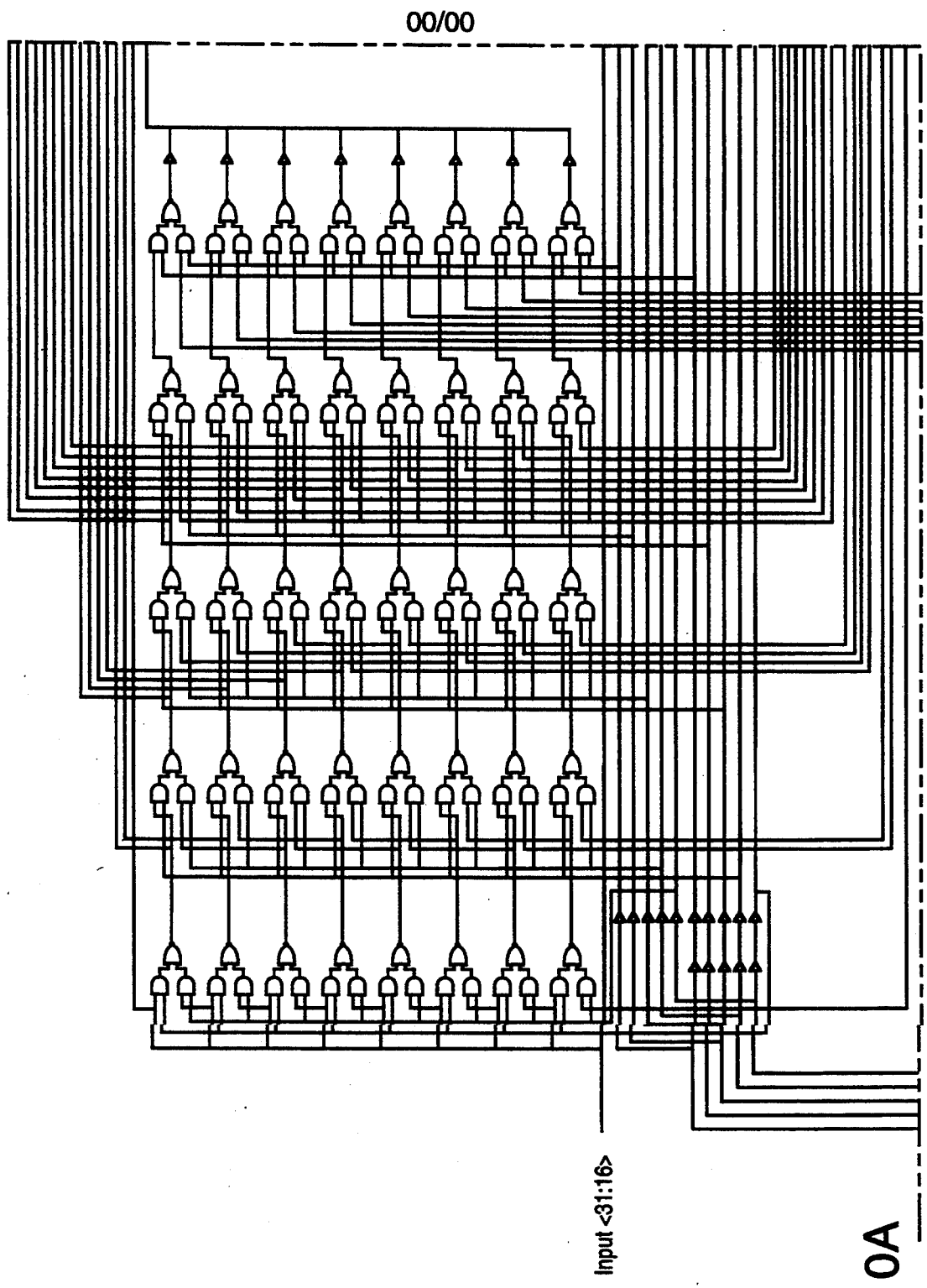
FIG. 10 is a shifter circuit suitable for use in the circuit of FIG. 11.
Figure 10B:
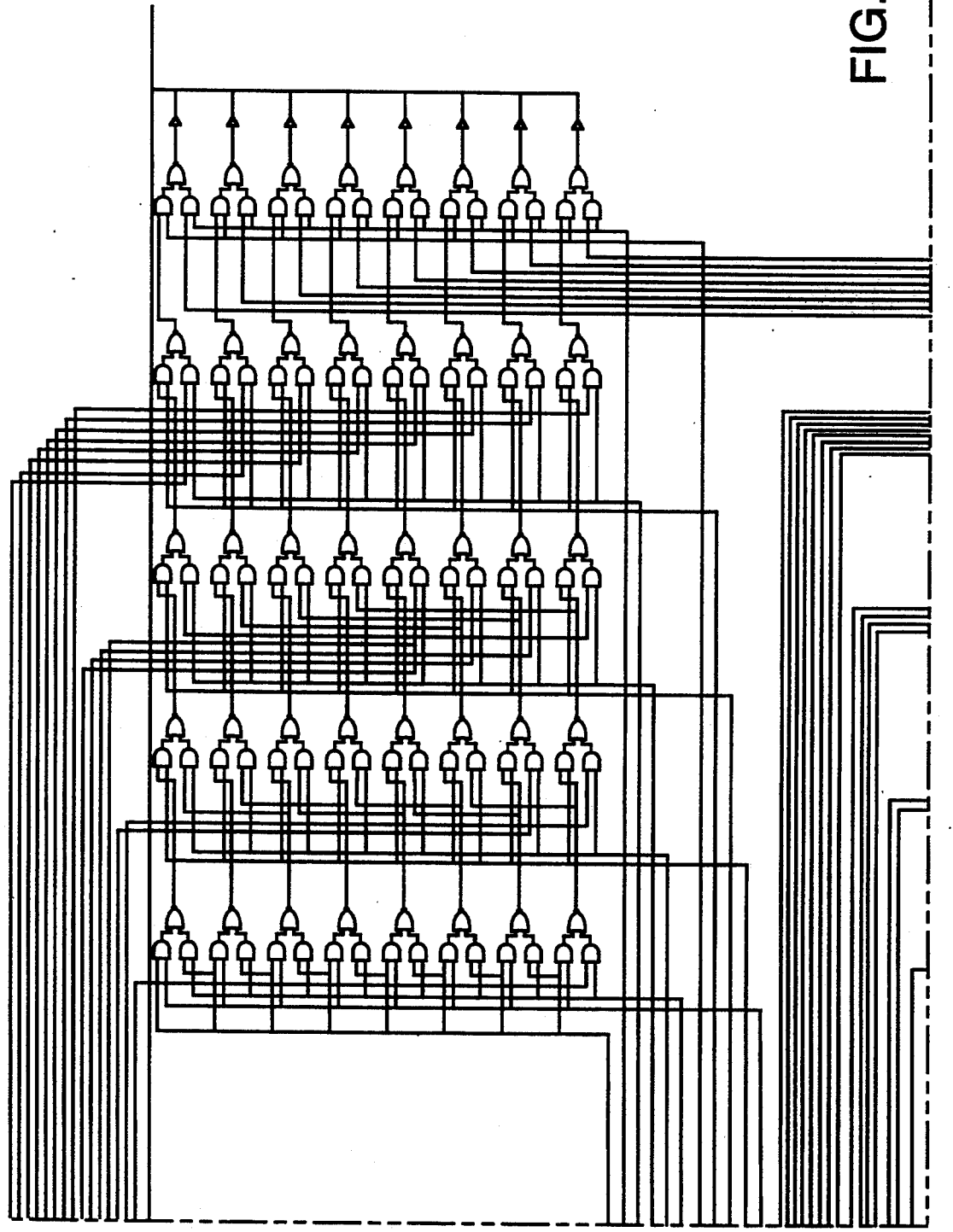
Figure 10C:
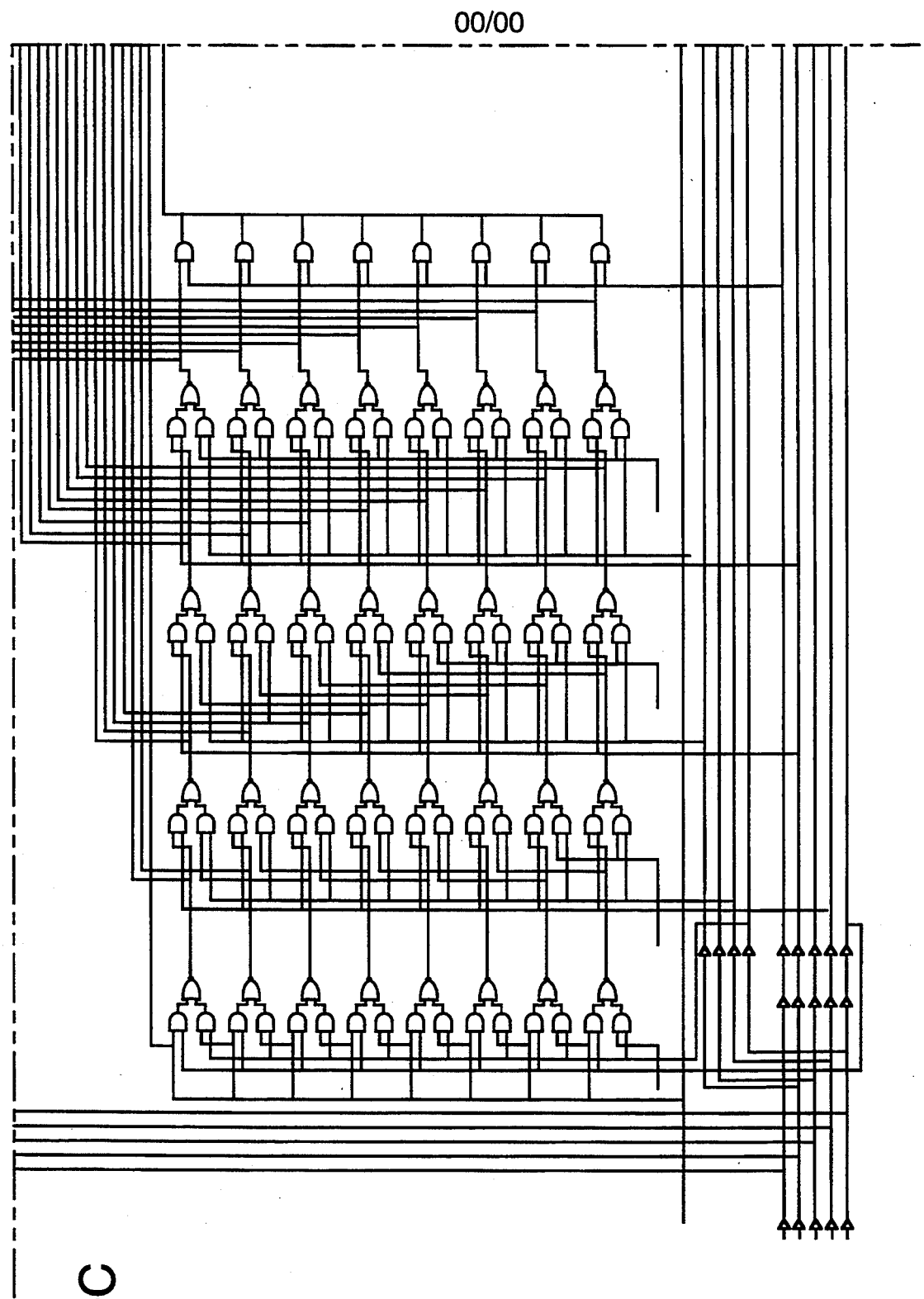
Figures 10, 10D:
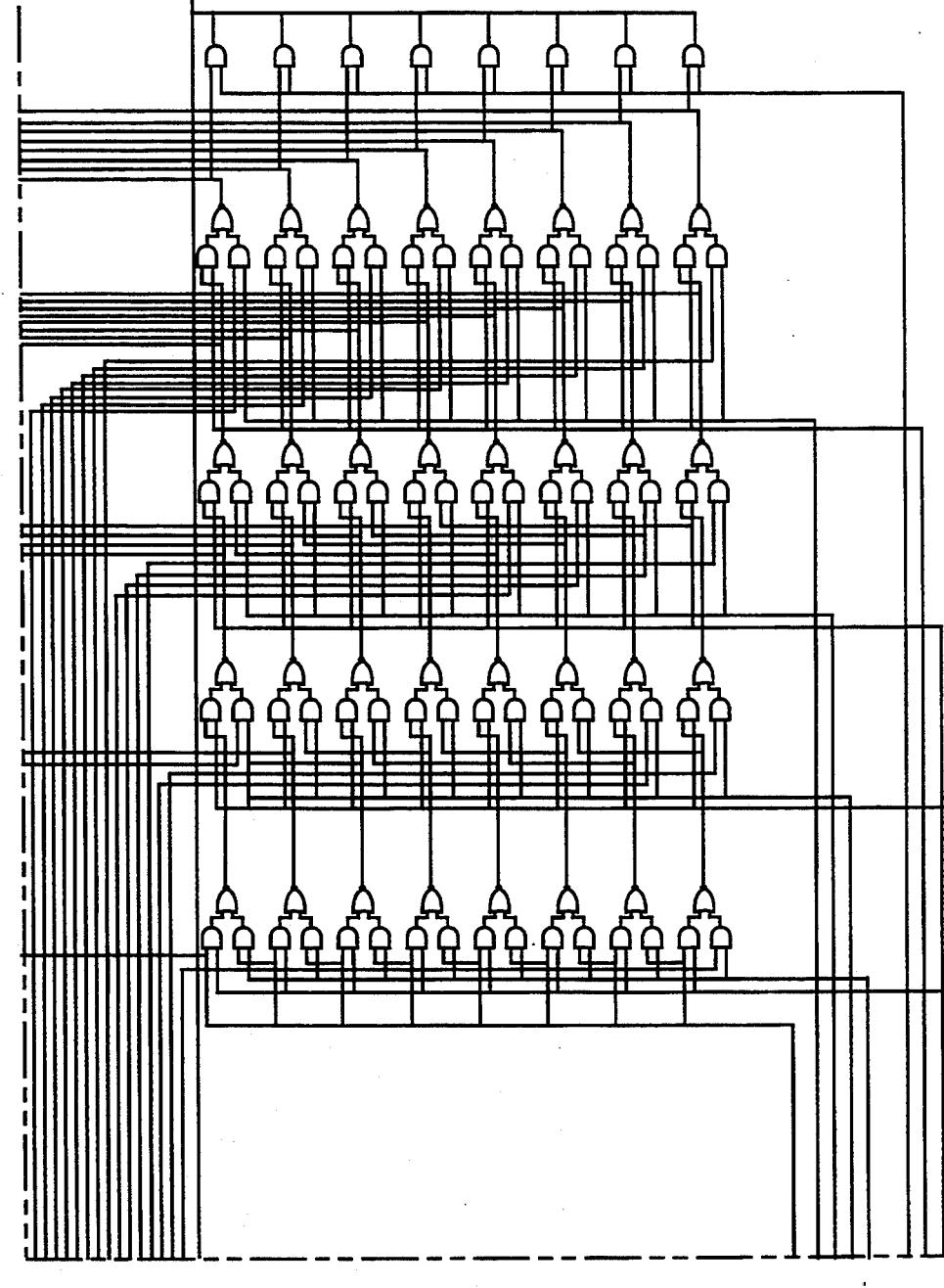

The unidirectional shifter 6 of FIG. 8 can be any unidirectional shifter known in the art. For example, the shifter shown in FIG. 10 is a generally known 32-bit shifter suitable for implementing the unidirectional shifter 6 of FIG. 8.

The above detailed description is intended to illustrate the specific embodiments of the present invention and not to limit the scope of the invention. The skilled person in the art will be able to provide, upon consideration of the above description and the accompanying drawings, various modifications and variations within the scope of the present invention. For example, one variation can be a system in which only right-shifts are performed. The present invention is defined by the following claims.

I claim:

1. A structure for packing a stream of n-bit data into a stream of m-bit data words (n≦m) for both little endian and big endian formats, comprising:

a 2m-bit register for holding up to 2m bits of packed data;

means for shifting in one direction only each of said n-bit data into position for insertion into said 2m-bit register as said packed data, said shifting means shifting each of said n-bit data, under said little endian format, a number of bits equalling the number of bits (modulo m) of said packed data in said 2m-bit register before said insertion, and under said big endian format, a number of bits equalling 2m minus both said number of bits (modulo m) of packed data and n; and means for transferring from said 2m-bit register an m-bit output datum whenever the number of bits of said packed data in said 2m-bit register exceeds m.

2. A structure as in claim 1, wherein said 2m-bit register contains a lower order m bits of data and a higher order m bits of data, said transferring means further comprises means for copying said lower order m bits of data in said 2m-bit register to become said higher order m bits of data in said 2m-bit register and vice versa.

3. A structure as in claim 2, wherein said copying means comprises multiplexors.

4. A structure as in claim 1, wherein said shifting means comprises a barrel shifter capable only of left-shift.

5. A structure as in claim 1, wherein said shifting means comprises OR gates for inserting each of said shifted n-bit data into said 2m-bit register.

6. A structure for unpacking a stream of n-bit data from a stream of m-bit data words for both little endian and big endian formats, comprising:
a 2m-bit register for holding as packed data up to two of said m-bit data words at a time;
means for shifting in one direction only content of said 2m-bit register, for extraction from predetermined bit positions each of said n-bit data, said shifting means shifting said content of said 2m-bit register, under said little endian format, a number of bits equalling the number of bits (modulo m) of said packed data remaining in said 2m-bit register before said extraction, and under said big endian format, a number of bits equalling 2m minus both said number of bits (modulo m) of packed data and n;
means for transferring into said 2m-bit register an m-bit input datum as said packed data whenever the number of bits of said packed data in said 2m-bit register is less than m.

7. A structure as in claim 6, wherein said 2m-bit register contains a lower order m bits of data and a higher order m bits of data, said transferring means further comprises means for copying said lower order m bits of data in said m-bit register to become said higher order m bits of data in said 2m-bit register and vice versa.

8. A structure as in claim 7, wherein said copying means comprises multiplexors.

9. A structure as in claim 6, wherein said shifting means comprises a barrel shifter capable only of left-shift.

10. A structure as in claim 6, wherein said shifting means comprises means for masking selected bits of said 2m-bit register in order to extract each of said n-bit data from said 2m-bit register.

11. A method for packing a stream of n-bit data into a stream of m-bit words for both little endian and big endian formats, comprising the steps:
providing a 2m-bit register for holding up to 2m bits of packed data; and
repeating in order the steps of:
(i) shifting in a one direction-only shifter each of said n-bit data into position for insertion into said 2m-bit register as said packed data, said shifting step shifting each of said n-bit data, under said little endian format, a number of bits equalling the number of bits (modulo m) of said packed data in said 2m-bit register before said insertion, and under said big endian format, a number of bits equalling 2m minus both said number of bits (modulo m) of said packed data and n; and
(ii) transferring from said 2m-bit register an m-bit output datum whenever the number of bits of packed data in said 2m-bit register exceeds m.

12. A method as in claim 11, wherein said 2m-bit register contains a lower order m bits of data and a higher order m bits of data, said transferring step further comprises the step of copying said lower order m bits of data in said 2m-bit register to become said higher order m bits of data in said 2m-bit register and vice versa.

13. A method as in claim 12, wherein said copying step uses multiplexors.

14. A method as in claim 13, wherein said shifting step comprises only left-shifts.

15. A method as in claim 11, wherein said shifting step comprises the step of using OR gates for inserting each of said shifted n-bit data into said 2m-bit register.

16. A method for unpacking a stream of n-bit data from a stream of m-bit data words (n≦m) for both little endian and big endian formats, comprising the steps of:
providing a 2m-bit register for holding as packed data up to two of said m-bit data words at a time; and
repeating in order the steps of:
(i) transferring into said 2m-bit register an m-bit input datum as said packed data whenever the number of bits of packed data in said 2m-bit register is less than m; and
(ii) shifting in a one direction-only shifter content of said 2m-bit register, for extraction from predetermined bit positions each of said n-bit data, said shifting step shifting said content of said 2m-bit register, under said little endian format, a number of bits equalling the number of bits (modulo m) of said packed data remaining in said 2m-bit register before said extraction, and under said big endian format, a number of bits equalling 2m minus both said number of bits (modulo m) of said packed data and n.

17. A method as in claim 16, wherein said 2m-bit register contains a lower order m bits of data and a higher order m bits of data, said transferring step further comprises the step of copying said lower order m bits of data in said 2m-bit register to become said higher order m bits of data in said 2m-bit register and vice versa.

18. A method as in claim 17, wherein said copying step is uses multiplexors.

19. A method as in claim 16, wherein said shifting step comprises only left-shifts.

20. A method as in claim 16, wherein said shifting step comprises the step of masking selected bits of said 2m-bit register in order to extract each of said n-bit of data from said 2m-bit register.

* * * * *